United States Patent
Han et al.

(10) Patent No.: US 8,675,564 B2
(45) Date of Patent: Mar. 18, 2014

(54) MULTI-CELL TRANSMISSION DIVERSITY METHOD AND APPARATUS

(75) Inventors: Jin Kyu Han, Seoul (KR); Ju Ho Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 132 days.

(21) Appl. No.: 13/255,041

(22) PCT Filed: Mar. 3, 2010

(86) PCT No.: PCT/KR2010/001319
§ 371 (c)(1),
(2), (4) Date: Sep. 6, 2011

(87) PCT Pub. No.: WO2010/101404
PCT Pub. Date: Sep. 10, 2010

(65) Prior Publication Data
US 2011/0317582 A1    Dec. 29, 2011

(30) Foreign Application Priority Data
Mar. 4, 2009    (KR) .................. 10-2009-0018471

(51) Int. Cl.
*H04W 4/00*    (2009.01)
(52) U.S. Cl.
USPC .......................................................... 370/328
(58) Field of Classification Search
USPC .............. 370/252, 310.2, 310, 312, 315, 328, 370/335, 342, 535
See application file for complete search history.

(56) References Cited

U.S. PATENT DOCUMENTS

| | | | |
|---|---|---|---|
| 7,092,737 B2 * | 8/2006 | Horng et al. | 455/562.1 |
| 7,778,355 B2 * | 8/2010 | Onggosanusi et al. | 375/299 |
| 2007/0109191 A1 | 5/2007 | van Rooyen et al. | |

FOREIGN PATENT DOCUMENTS

| | | |
|---|---|---|
| KR | 1020070022589 | 2/2007 |
| KR | 1020070096883 | 10/2007 |
| WO | WO 2007024073 | 3/2007 |
| WO | WO 2007111449 | 10/2007 |
| WO | WO 2008023332 | 2/2008 |

OTHER PUBLICATIONS

PCT/ISA/237 Written Opinion issued on PCT/KR2010/001319 (4 pp.).
PCT/ISA/210 Search Report issued on PCT/KR2010/001319 (3 pp.).

* cited by examiner

*Primary Examiner* — Anh Ngoc Nguyen
(74) *Attorney, Agent, or Firm* — The Farrell Law Firm, P.C.

(57) ABSTRACT

A multi-cell transmission diversity method and apparatus that is capable of forming two virtual antennas of each cell and producing orthogonality of the virtual antennas using an improved precoding technique in an OFDM-based cellular mobile communication system is provided for improving transmission diversity gain with coherent combination of the orthogonal signals at the receiver. A multi-cell transmission diversity transmission method of a transmitter according to the present invention includes generating a first signal stream and a second signal stream by performing transmission diversity encoding on a user data; multiplexing and precoding the first signal stream and a first dedicated reference signal into a first diversity signal; multiplexing and precoding the second signal stream and a second dedicated reference signal a second diversity signal; and transmitting the first and second diversity signals simultaneously, wherein the first dedicated reference signal and the second dedicated reference signal are user-specific reference signal signals.

20 Claims, 6 Drawing Sheets

MULTI-CELL TRANSMISSION DIVERSITY METHOD AND APPARATUS

TECHNICAL FIELD

The present invention relates to an OFDM-based cellular mobile communication system and, in particular, to a multi-cell transmission diversity method and apparatus that is capable of forming two virtual antennas of each cell and producing orthogonality of the virtual antennas using an improved precoding technique in an OFDM-based cellular mobile communication system, thereby improving transmission diversity gain with coherent combination of the orthogonal signals at the receiver.

BACKGROUND ART

The evolution to the high speed and high quality wireless packet data communication system has transformed the voice-oriented communication service to the data and multimedia services. The High Speed Packet Access (HSPA) and Long Term Evolution (LTE) of the $3^{rd}$ Generation Partnership Project (3GPP), High Rate Packet Data (HRPD) and Ultra Mobile Broadband (UMB), and 802.16e of the Institution of Electrical and Electronics Engineers (IEEE) are the mobile communication standards developed for supporting such high speed and high quality wireless data transmission services.

These recent mobile communication technologies use sophisticated techniques such as an Adaptive Modulation and Coding (AMC) and/or channel-sensitive scheduling. The AMC is a technique to adjust the transmission amount of data according to the channel conditions. This means that the transmitter decreases the transmission data amount in bad channel condition to limit the received signal error probability to a wanted level and increases the transmission data amount in good channel condition while maintaining the signal error probability level. The channel sensitive scheduling allows the transmitter to allocate channels to multiple users selectively according to the channel condition so as to increase the system throughput. In the system using the AMC and channel-sensitive scheduling, the transmitter receives feedback from the receivers and performs transmission at the most effective timing with most appropriated modulation and coding scheme.

Meanwhile, the wireless access technology which is dominant in 2G and 3G system is evolving from Code Division Multiple Access (CDMA) to Orthogonal Frequency Division Multiple Access (OFDMA). The 3GPP and 3GPP2 have begun working on the standardization of the OFDMA-based evolved system. OFDMA is known superior to CDMA in capacity improvement.

It is one of the various factors for increasing the system capacity that the OFDMA can exploit frequency domain scheduling. In addition to the channel-sensitive scheduling, the frequency domain scheduling allows further system capacity gain in time-varying channel environments.

The AMC and channel-sensitive scheduling are technologies to improve the transmission efficiency based on the information about the transmission channels. Typically, a Frequency Division Duplex (FDD) system, in which the transmitter cannot infer the condition of its transmission channel, is designed such that the receiver reports the channel information to the transmitter. However, since the channel condition varies as time progresses in the wireless communication environment, feedback delay causes degradation of the efficiency of the AMC and channel-sensitive scheduling. This can be worse when the receiver is in high mobility state. Accordingly, there is a need for a supplementary transmission scheme to maintain the ongoing communication at least reliable level even when the channel condition feedback has become unreliable.

The technologies that are typically referred to as diversity methods are known less sensitive to the channel conditions. For instance, a frequency diversity method performs transmission through the frequency channels spaced enough on the frequency domain. Considering the frequency selective fading environment, the responses of the channels spaced enough are less correlated with each other. This means that the frequency diversity transmission can reduce the probability of any worst case of transmission failure because, even when one frequency resource experiences bad channel condition, the other frequency resource does not do.

Spatial diversity is another diversity scheme that uses multiple transmission and/or reception antennas. Assuming the transmission and/or reception antennas are spaced far enough from each other, the channel responses of the antennas are less correlated. Accordingly, the spatial diversity can decrease the probability to experience of the worst transmission condition even when one of the antennas experiences a bad channel response.

Transmission diversity is a special case of the spatial diversity applied to the transmitter. There are various transmission diversity techniques including Selective Transmission diversity, Space Time coding, Orthogonal Transmission diversity, etc.

In a cellular communication system, a base station serves mobile stations within its radio coverage, also referred to as cell, and triggers a handover of the mobile station moving out of its coverage to a neighbor base station for maintaining the ongoing call. In the cellular structure, the user located at the boundary of a cell is likely to experience the interference caused by the signal of neighbor base stations, resulting in bad channel state. Also, the closer the mobile station is to the base station, the higher the service transmission rate is.

In order to solve this problem, the 4th Generation (4G) mobile communication systems are expected to be implemented with a newly introduced technique called collaborative transmission in which the adjacent base stations transmit the same signal to a mobile station located at the cell boundary.

The collaborative transmission techniques can be classified into low level collaborative transmission technique and high level collaborative transmission technique. In the low level collaborative transmission technique, the base stations do not share the signal transmission but collaborates to make scheduling and beamforming decisions. In contrast, the high level collaborative transmission technique, the base stations collaborate for actual signal transmission as well as the scheduling and beamforming decisions. Although it increases the network traffic due to the increase of information exchanged between the base stations, the high level collaborative transmission technique is advantageous to improve the channel condition at the cell boundary since the mobile station can achieve transmission diversity gain from the transmissions of the base stations.

The transmission diversity is known to be optimized with two transmission antennas, since the recipient device can achieve the coherent combination of the received signals using the orthogonality without compromising data rate. In case that two cells, each having a single transmission antenna, are involved, it is ease to implement the high level collaborative transmission in which the both the base station transmit the same signal, resulting in transmission diversity gain. In other cases using more than two transmission antennas, however, other diversity technique, rather than the optimized transmission diversity, has to be adopted.

For instance, when three cells, each having a single transmission antenna, are involved in the collaborative transmission, another transmission diversity technique is required to achieve transmission diversity gain. Also, when two bases stations, each having multiple transmit antennas, are involved in the collaborative transmission, still another diversity technique is required.

DISCLOSURE OF INVENTION

Technical Problem

Even though the transmission diversity schemes suited for the number of involved cells and the number of transmit antennas of each cell are defined, the diversity scheme should be changed according to the change of the number of cells involved in the collaborative transmission due to the time-varying channel condition. This means that the receiver can be implemented to deal with all the kinds of transmission diversity schemes, resulting in reception complexity of the receiver.

There is therefore a need to develop a multi-cell diversity method that is capable of supporting the collaborative transmission situations irrespective of the number of involved cells and/or the number of transmit antenna(s) of each cell.

Solution to Problem

In order to overcome the problem of the prior art, the present invention provides a multi-cell transmission diversity method and apparatus that is capable of achieving transmission diversity gain with the high level collaborative transmission technique.

Also, the present invention provides a multi-cell transmission diversity method and apparatus that is capable of achieving transmission diversity gain regardless of the change of the number of cells involved in the collaborative transmission and/or the number of antenna of each cell.

In accordance with an exemplary embodiment of the present invention, multi-cell transmission diversity transmission method of a transmitter includes generating a first signal stream and a second signal stream by performing transmission diversity encoding on a user data; multiplexing and precoding the first signal stream and a first dedicated reference signal into a first diversity signal; multiplexing and precoding the second signal stream and a second dedicated reference signal a second diversity signal; and transmitting the first and second diversity signals simultaneously, wherein the first dedicated reference signal and the second dedicated reference signal are user-specific reference signal signals.

In accordance with another exemplary embodiment of the present invention, a multi-cell transmission diversity reception method of a receiver includes demultiplexing a received signal into a first signal stream, a first dedicated reference signal, a second signal stream, and a second dedicated reference signal, the first and second signal streams carrying a data signal; estimating a channel for receiving a first diversity signal using the first dedicated reference signal; estimating a channel for receiving a second diversity signal using the second dedicated reference signal; recovering the data signal using the estimated channels, wherein the first and second dedicated reference signals are user-specific reference signals.

In accordance with another exemplary embodiment of the present invention, a transmitter for supporting multi-cell transmission diversity in which multiple cells transmit the same signal to a receiver simultaneously includes a transmission diversity encoder which encodes a user data into a first signal stream and a second signal stream; a first multiplexer which multiplexes the first signal stream with a first dedicated reference signal into a first diversity signal; a second multiplexer which multiplexes the second signal stream with a second dedicated reference signal into a second diversity signal; a first precoder which performs precoding on the first diversity signal; a second precoder which performs precoding on the second diversity signal; and at least two antenna which transmit the precoded diversity signals to the receiver, wherein the first and second dedicated reference signals are user-specific reference signals.

In accordance with still another exemplary embodiment of the present invention, a receiver for supporting multi-cell transmission diversity in which multiple cells transmit the same signal to the receiver simultaneously includes a demultiplexer which demultiplexes a received signal into a first signal stream, a first dedicated reference signal, a second signal stream, and a second dedicated reference signal, the first and second signal streams carrying a data signal; a channel estimator which estimates channels for receiving a first diversity signal using the first dedicated reference signal and a second diversity signal using the second dedicated reference signal; and a transmission diversity decoder which decodes the data signal using the channels estimated by the channel estimator.

Advantageous Effects of Invention

According to the present invention, the multi-cell transmission diversity method and apparatus of the present invention allows each cell involved in the collaborative transmission to form two virtual antennas using DRS and precoders for transmission diversity, thereby achieving robust and uniform transmission diversity gain regardless of the number of cells involved in the collaborative transmission and the number of antenna of each cell. Also, the multi-cell transmission diversity method and apparatus of the present invention is capable of recovering the transmitted data with channel estimation on the virtual antennas without modification of the conventional receiver structure. Also, the multi-cell transmission diversity method and apparatus of the present invention is configured such that the corresponding virtual antennas of the individual cells involved in the collaborative transmission use the same DRSs, thereby recovering the transmitted data without differentiating between the collaborative cells.

BRIEF DESCRIPTION OF DRAWINGS

The above and other objects, features and advantages of the present invention will be more apparent from the following detailed description in conjunction with the accompanying drawings, in which.

MODE FOR THE INVENTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
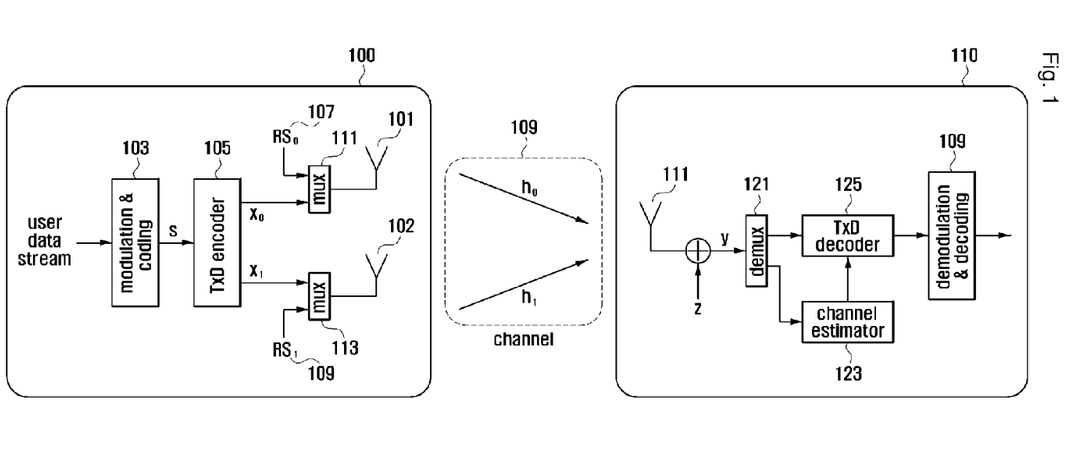
FIG. 1 is a schematic block diagram illustrating a multi-cell transmission diversity system according to an exemplary embodiment of the present invention.

FIG. 1 is a schematic block diagram illustrating a multi-cell transmission diversity system according to an exemplary embodiment of the present invention.

In FIG. 1, the multi-cell transmission diversity system includes a transmitter 100 and a receiver 110.

The transmitter 100 includes two transmit antennas, i.e. a first transmit antenna 101 and a second transmit antenna 102. In order to simplify the explanation, it is assumed that the receiver 110 includes a single receive antenna 111. In case that multiple receive antennas are used, the receiver 110 can be provided with corresponding numbers of combining units operating identically. The transmitter 100 transmits a signal through the two transmit antennas 101 and 102, and the receiver 110 receives the signals experienced the respective channels h0 and h1. Here, h0 is the channel response between the first transmit antenna 101 and the receive antenna 111, and h1 is the channel response between the second transmit antenna 102 and the receive antenna 111. A user data stream is modulated and coded by a modulation and coding unit 103 of the transmitter 100 and output in the form of a modulation symbol stream $$S = [S_0, S_1, \ldots, S_{2N-2} S_{2N-1}].$$

Here, it is assumed for the purpose of transmission diversity encoding that the length of the modulation symbol stream is 2N. The modulation symbol stream is input to a transmission diversity (TxD) encoder 105 of the transmitter 100, and the TxD encoder 105 outputs two symbol streams X0 and X1. The operation of the TxD encoder 105 is described in detail with reference to FIGS. 2 and 4 later. The first modulation symbol stream is transmitted through the first transmit antenna 101, and the second modulation symbol stream is transmitted through the second transmit antenna 101.

In order for the receiver 110 to estimate the channels h0 and h1, the transmitter 100 has to transmit a reference signal (RS) per transmit antenna. A reference signal RS0 107 for the first channel h0 is multiplexed with the first modulation symbol stream X0 by a first multiplexer 111 of the transmitter 100, and a reference signal RS1 109 for the second channel h1 is multiplexed with the second modulation symbol stream X1 by a second multiplexer 113 of the transmitter 100.

The signal y received by receiver 110 is the sum of the transmitted signal 100 and an Additive White Gaussian Noise (AWGN). A demultiplexer 121 of the receiver 110 separates the RSs and the transmitted signal and sends the RSs to a channel estimator 123 and the transmitted signal to a transmission diversity (TxD) decoder 125. The TxD decoder 125 recovers the transmitted modulation symbol stream using the channel values $\hat{h}_0$ and $\hat{h}_1$ estimated by the channel estimator 123 and outputs the modulation symbol stream to a demodulation and decoding unit 127. The demodulation and decoding unit 127 performs demodulation and decoding on the modulation symbol stream to acquire the original transmission signal.

Figure 2:
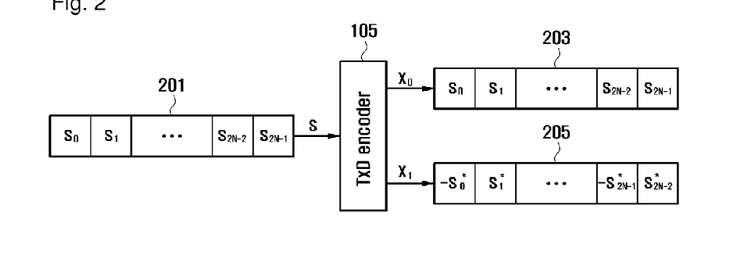
FIG. 2 is a diagram illustrating the operation of the TxD encoder of FIG. 1 according to an exemplary embodiment of the present invention.

FIG. 2 is a diagram illustrating the operation of the TxD encoder of FIG. 1 according to an exemplary embodiment of the present invention.

Referring to FIG. 2, the TxD encoder 105 performs diversity encoding on the modulation symbol stream s 201 and outputs two signal streams X0 and X1. In the embodiment of FIG. 2, the first symbol stream X0 is identical with the input symbol stream S and the second symbol stream X1 is output by encoding the input symbol stream S as expressed in Math Figure (1):

MathFigure 1

$$X_0 = S = [S_0, S_1, \ldots, S_{2N-2} S_{2N-1}]$$

$$X_1 = [-S_1^*, S_0^*, \ldots, -S_{2N-2}^* S_{2N-1}^*] \qquad [\text{Math.1}]$$

where S* is a conjugate value of S and, if $S = a + jb,$ $S^* = \sqrt{-1}.$

Figure 3:
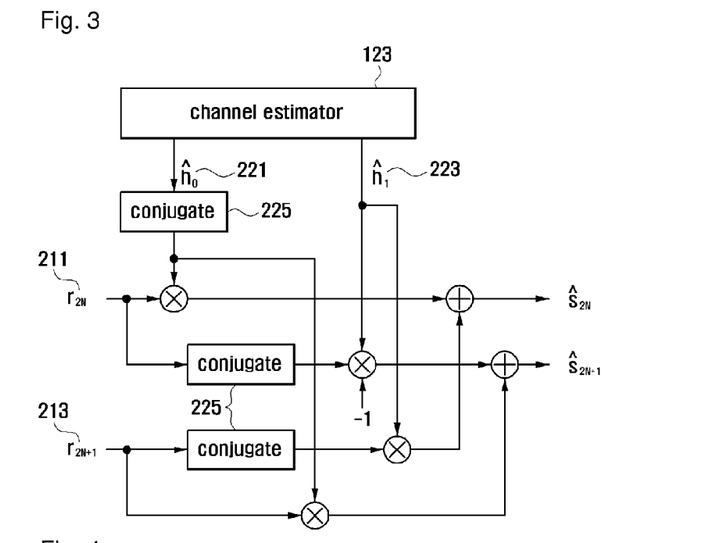
FIG. 3 is a diagram illustrating the configuration of the TxD decoder of the receiver of FIG. 1 for processing the signal encoded as shown in FIG. 2.

FIG. 3 is a diagram illustrating the configuration of the TxD decoder of the receiver of FIG. 1 for processing the signal encoded as shown in FIG. 2.

When two contiguous symbols $y_{2n}$ 211 and $y_{2n+1}$ 213 of a received symbol stream are input to the TxD decoder 125, the TxD decoder 125 recovers the transmitted symbols $S_{2n}$ and $S_{2n+1}$ using the estimated channel values $\hat{h}_0$ 221 and $\hat{h}_1$ 223 fed by the channel estimator 123 (n=0, 1, ..., N−1). Here, the conjugators 225 of the TxD decoder 125 performs conjugate function. The received symbols $y_{2n}$ 211 and $y_{2n+1}$ and the recovered symbols $\hat{S}_{2n}$ and $\hat{S}_{2n+1}$ can be expressed as Math Figure (2):

MathFigure 2

$$y_{2n}=h_0 s_{2n}-h_1 s_{2n+1}^*+z_{2n}$$

$$y_{2n+1}=h_0 s_{2n+1}+h_1 s_{2n}^*+z_{2n+1}$$

$$\hat{s}_{2n}=\hat{h}_0^* y_{2n}+\hat{h}_1 y_{2n+1}^*=(\hat{h}_0^* h_0+\hat{h}_1 h_1^*)s_{2n}+(\hat{h}_1 h_0^*-\hat{h}_0^* h_1)s_{2n+1}^*+\hat{h}_0^* z_{2n}+\hat{h}_1 z_{2n+1}^*$$

$$\hat{s}_{2n+1}=\hat{h}_0^* y_{2n+1}-\hat{h}_1 y_{2n}^*=(\hat{h}_0^* h_0+\hat{h}_1 h_1^*)s_{2n+1}+(\hat{h}_0^* h_1-\hat{h}_1 h_0^*)s_{2n}^*+\hat{h}_0^* z_{2n+1}-\hat{h}_1 z_{2n}^*$$  [Math.2]

Assuming ideal channel estimation of $$\hat{h}_0=h_0$$

and $$\hat{h}_1=h_1,$$

the recovered symbols $$\hat{s}_{2n}$$

and $$\hat{s}_{2n+1}$$

can be expressed as Math Figure (3):

MathFigure 3

$$\hat{s}_{2n}=(|h_0|^2+|h_1|^2)s_{2n}+h_0^* z_{2n}+h_1 z_{2n+1}^*$$

$$\hat{s}_{2n+1}=(|h_0|^2+|h_1|^2)s_{2n+1}+h_0^* z_{2n+1}-h_1 z_{2n}^*$$  [Math.3]

This means that the transmitted symbols $S_{2n}$ and $S_{2n+1}$ are recovered successfully, and the expected Signal-to-Noise Ratio (SNR) is expressed as Math Figure (4):

MathFigure 4

$$\Gamma=\frac{1}{2}(|h_0|^2+|h_1|^2)\gamma=\frac{1}{2}(|h_0|^2+|h_1|^2)\frac{P_S}{\sigma_z^2}$$  [Math. 4]

Here, $P_s$ denotes energy allocated for transmitted symbol stream S, and $$\sigma_z^2$$

denotes the variance of AGWN z. If the symbol stream is transmitted through the first transmit antenna 101 or the second transmit antenna 102 without use of the transmission diversity, the expected SNRs for the respective antennas are $$|h_0|^2 \gamma$$

and $$|h_1|^2 \gamma.$$

In order to prevent the performance degradation on the channel without knowledge about the channels of the transmit antennas, it is required to avoid the worst channel condition. According to equation (4), the SNR with the transmission diversity is not less than the least value of the SNR with a signal transmit antenna.

Figure 4:
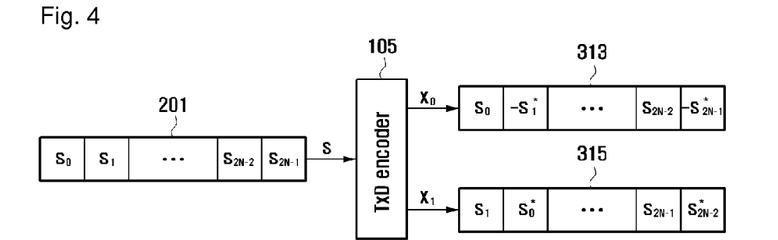
FIG. 4 is a diagram illustrating the operation of the TxD encoder of FIG. 1 according to another exemplary embodiment of the present invention.

FIG. 4 is a diagram illustrating the operation of the TxD encoder of FIG. 1 according to another exemplary embodiment of the present invention.

As shown in FIG. 4, the modulation symbol stream S 201 is diversity encoded by the TxD encoder 105 to produce two diversity-encoded symbol streams $X_0$ and $X_1$. The diversity-encoded symbol streams $X_0$ and $X_1$ can be expressed as Math Figure (5).

MathFigure 5

$$X_0=S=[S_0,-S_1^*,\ldots,S_{2N-2},-S_{2N-1}]$$

$$X_1=[-S_1,S_0^*,\ldots,S_{2N-1},S_{2N-2}^*]$$  [Math.5]

In Math Figure (5), Alamouti encoding is used.

Figure 5:
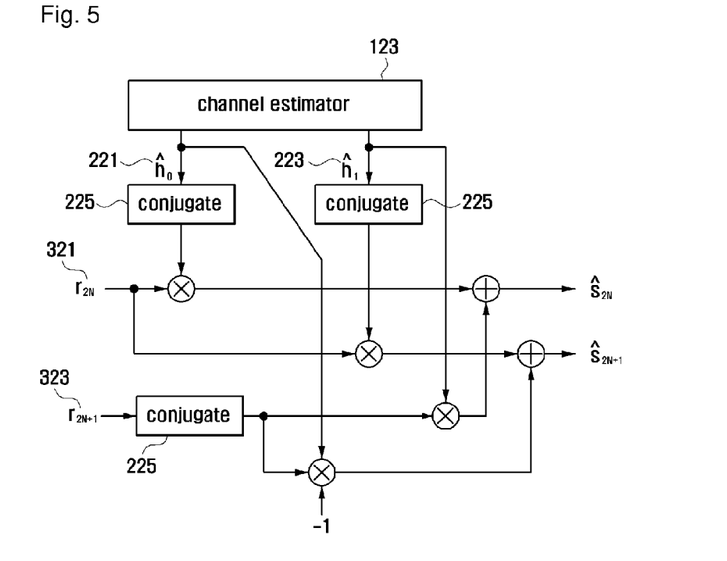
FIG. 5 is a diagram illustrating the configuration of the TxD decoder of the receiver of FIG. 1 for processing the signal encoded as shown in FIG. 4.

FIG. 5 is a diagram illustrating the configuration of the TxD decoder of the receiver of FIG. 1 for processing the signal encoded as shown in FIG. 4.

When two contiguous symbols $y_{2n}$ 321 and $y_{2n+1}$ 323 of a received symbol stream are input to the TxD decoder 125, the TxD decoder 125 recovers the transmitted symbols $S_{2n}$ and $S_{2n+1}$ using the estimated channel values $$\hat{h}_0$$

221 and $$\hat{h}_1$$

223 fed by the channel estimator 123 (n=0, 1, . . . , N−1).

The received symbols $y_{2n}$ 211 and $y_{2n+1}$ and the recovered symbols $$\hat{s}_{2n}$$

and $$\hat{s}_{2n+1}$$

can be expressed as Math Figure (6):

MathFigure 6

$$y_{2n}=h_0 s_{2n}+h_1 s_{2n+1}+z_{2n}$$

$$y_{2n+1}=h_0 s_{2n+1}^*+h_1 s_{2n}^*+z_{2n+1}$$

$$\hat{s}_{2n}=\hat{h}_0^* y_{2n}+\hat{h}_1 y_{2n+1}^*=(\hat{h}_0^* h_0+\hat{h}_1 h_1^*)s_{2n}+(\hat{h}_0^* h_1-\hat{h}_1 h_0^*)s_{2n+1}+\hat{h}_0^* z_{2n}+\hat{h}_1 z_{2n+1}^*$$

$$\hat{s}_{2n+1}=\hat{h}_1^* y_{2n}-\hat{h}_0 y_{2n+1}^*=(\hat{h}_1^* h_1+\hat{h}_0 h_0^*)s_{2n+1}+(\hat{h}_1^* h_0-\hat{h}_0 h_1^*)s_{2n}+\hat{h}_1^* z_{2n}-\hat{h}_0 z_{2n+1}^*$$  [Math.6]

Assuming ideal channel estimation of and $$\hat{h}_0=h_0$$

and $$\hat{h}_1=h_1,$$

the recovered symbols $$\hat{s}_{2n}$$

and $$\hat{s}_{2n+1}$$

can be expressed as Math Figure (7):

MathFigure 7

$$\hat{s}_{2n}=(|h_0|^2+|h_1|^2)s_{2n}+h_0^* z_{2n}+h_1 z_{2n+1}^*$$

$$\hat{s}_{2n+1}=(|h_0|^2+|h_1|^2)s_{2n+1}+h_1^* z_{2n}-h_0 z_{2n+1}^*$$  [Math.7]

This means that the transmitted symbols $S_{2n}$ and $S_{2n+1}$ are recovered successfully, and the expected Signal-to-Noise Ratio (SNR) is expressed as Math FIG. 4). Accordingly, the transmission diversity methods described with reference to FIGS. 2 and 4 are identical in performance.

The above described transmission diversity methods are optimized for the system using two transmit antennas from the viewpoint of the receiver by using coherent combination of the received signals using their orthogonality without compromising data rate. In case that two cells are involved in the collaborative transmission and each cell uses one transmit antenna, it is possible to adopt the high level collaborative transmission in which the cells are transmitting the same signal simultaneously. In other cases where the total number of transmit antennas of the cells involved in the transmission is greater than 2, a new transmission diversity scheme is required rather than the above described ones. For instance, in case that three cells, each having a single transmit antenna, are involved in the collaborative transmission, another transmission diversity scheme has to be used to achieve the optimized diversity gain. Also, in case that more than two cells, each having multiple transmit antennas, are involved in the collaborative transmission, still another transmission diversity scheme has to be used to achieve the optimized diversity gain.

Even when all the transmission diversity schemes optimized for the different number of cells involved in the collaborative transmission and the total number of transmit antennas, it is required to change the transmission diversity scheme used in the collaborative transmission according to the change of the number of cells due to the variation of the channel conditions. This means that the receiver has to be implemented to support the different types of transmission diversity schemes, resulting in increase of reception diversity.

In the present invention, a multi-cell transmission diversity method and apparatus that is capable of achieving transmission diversity gain regardless of the change of the number of cells involved in the collaborative transmission and/or the number of antenna of each cell.

Figure 6:
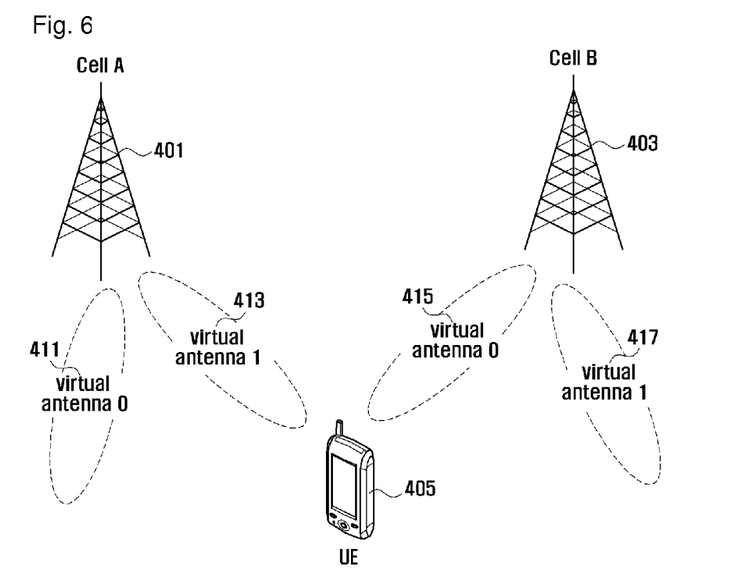
FIG. 6 is a diagram illustrating a multi-cell transmission diversity system using virtual antennas for the collaborative transmission according to an exemplary embodiment of the present invention.

FIG. 6 is a diagram illustrating a multi-cell transmission diversity system using virtual antennas for the collaborative transmission according to an exemplary embodiment of the present invention.

In FIG. 6, the User Equipment (UE) 405 is configured to support the high level cooperative transmission so as to receive the signal transmitted by the two cells cell A 401 and cell B 403. In the embodiment of FIG. 6, each cell is provided with two virtual antennas. That is, the cell A 401 includes a virtual antenna 0 411 (first virtual antenna) and a virtual antenna 1 413 (second virtual antenna), and the cell B 403 includes a virtual antenna 0 415 (first virtual antenna) and a virtual antenna 1 417 (second virtual antenna). When the cells 401 and 403 are transmitting the signal to the UE 405 collaboratively in high level collaborative transmission mode, the UE 405 receives the signals transmitted by the cells 401 and 403 without distinguishing between the first virtual antennas 411 and 415 and between the second antennas 413 and 417. Although it is depicted that just two cells 401 and 403 are involved in the collaborative transmission, more than two cells can be involved in the collaborative transmission according to the system design and the channel conditions.

Figure 7:
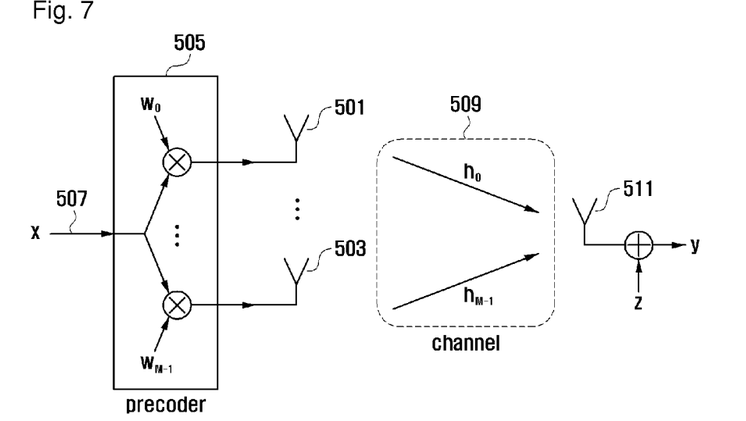
FIG. 7 is a diagram illustrating a channel model between a cell and a UE in the multi-cell diversity system of FIG. 6.

FIG. 7 is a diagram illustrating a channel model between a cell and a UE in the multi-cell diversity system of FIG. 6.

Figure 8:
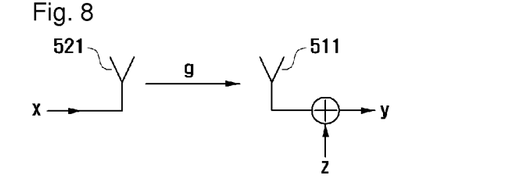
FIG. 8 is a diagram illustrating an equivalent form of the channel model of FIG. 7.

Referring to FIG. 7, a precoder 505 performs precoding on a transmission signal x 507 with different precoding weight values for M antennas 501 to 503. The signal is weighted by the weight value $W_0$ for the first antenna 501 and the weight value $W_{M-1}$ for the last antenna 503. That is, the first antenna 501 transmits the signal $W_0 x$, and the last antenna 503 transmits the signal $W_{M-1} x$. The signals weighted with different weight values propagate through different channels $h_0$ and $h_1$ 509 and then received through a receive antenna 511. The transmit antennas 501 and 503 are used for transmitting the same transmission signal x 507 and are equivalent to the structure as shown in FIG. 8. FIG. 8 is a diagram illustrating an equivalent form of the channel model of FIG. 7. As shown in FIG. 8, the transmission signal x 507 can expressed as it is transmitted signal transmitted by a single transmit antenna 521 and received by the signal receive antenna 511. Here, the equivalent channel g can be expressed as Math Figure (8):

MathFigure 8

$$g = \sum_{m=0}^{M-1} w_m h_m \qquad \text{[Math. 8]}$$

The UE has to estimate the channel to demodulate the transmitted signal successfully. That is, the UE can demodulate the transmitted signal with the successful estimation on the equivalent channel. In case that the virtual antennas are configured with the precoder 505 as shown in FIG. 7, the equivalent channel g can be estimated using two different methods.

In the first method, the UE knows the weight values $\{w_0, \ldots, w_{M-1}\}$ In more detail, the cell transmits the different RSs through the respective transmit antennas 501 to 503, and the UE estimates the channels $\{h_0, \ldots, h_{M-1}\}$ using the RSs transmitted by the cell. Simultaneously, the cell transmits the weight values $\{w_0, \ldots, w_{M-1}\}$ in the control information such that the UE can estimate the equivalent channel g by combining the estimated channels $\{h_0, \ldots, h_{M-1}\}$ and the weight values $\{w_0, \ldots, w_{M-1}\}$.

In the second method, the RS is inserted into the signal before the signal is precoded by the precoder 505 rather than transmitting different RSs through the respective antennas 501 and 503. In this case, since the RS is precoded along with the transmission signal x 507, the UE can estimate the equivalent channel g using the RS.

Since the RS is transmitted inserted onto the resource allocated per user in the second method, this RS is defined as Dedicated Reference Signal (DRS). Also, since it is transmitted for the purpose of the channel condition measurement and report can be observed by all the users, the RS per transmit antenna is defined as Common Reference Signal (CRS).

The DRS is multiplexed with the precoded signal stream for forming a virtual antenna. The UE can estimate the channels of the individual virtual antennas using the corresponding DRSs and recovers the transmitted signal. In contrast, the CRS is multiplexed with the precoded signals as the cell- and antenna-specific RS. The UE measures the channel conditions using the CRS and feeds back the measurements to the cell(s). As aforementioned, the DRS and CRS are different from each other in their features and purposes.

The first method requires to transmit any separate control signal for informing the UE of the precoding weight values $\{w_0, \ldots, w_{M-1}\}$ but is advantageous to reuse the CRS. In contrast, the second method has to define additional DRS but is advantageous since there is no need of the addition control signal for informing the UE of the precoding weight values $\{w_0, \ldots, w_{M-1}\}$.

In the embodiments of the present invention, the transmission diversity gain is achieved by using the virtual antennas as described with reference to FIGS. 7 and 8. By defining two pairs of the transmit antennas of two cells as shown in FIG. 6, it is possible for the two cells to transmit the same signal precoded for the transmission diversity.

Figure 9:
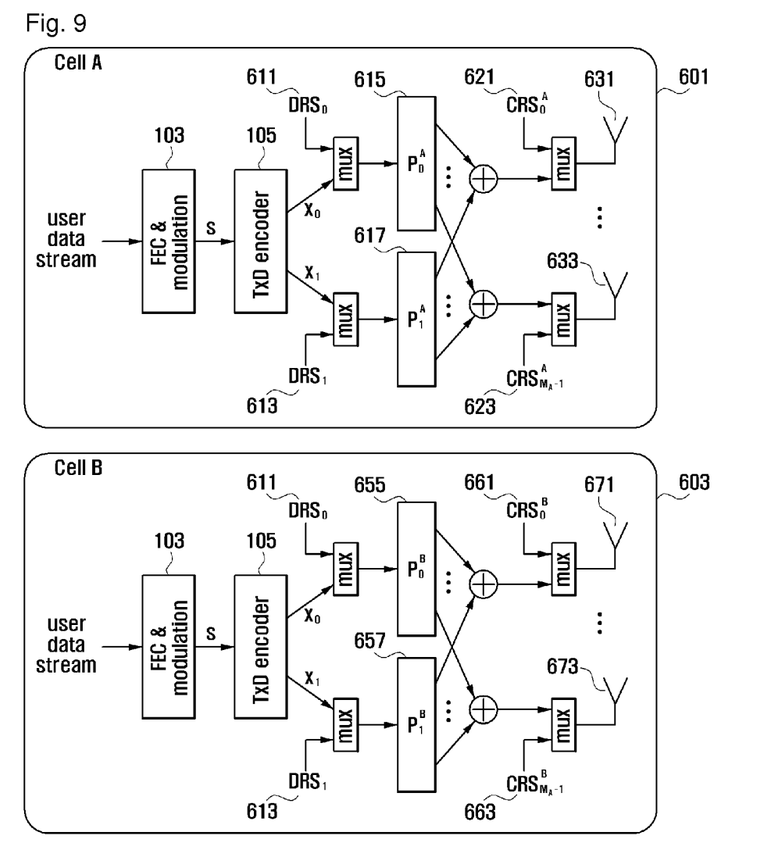
FIG. 9 is a diagram illustrating configurations of a pair of cells involved in a collaborative transmission for the multi-cell diversity transmission system according to an exemplary embodiment of the present invention.

FIG. 9 is a diagram illustrating configurations of a pair of cells involved in a collaborative transmission for the multi-cell diversity transmission system according to an exemplary embodiment of the present invention. In the embodiment of FIG. 9, the virtual antennas are implemented with the DRS and precoders 615, 617, 655, and 657.

If a user data stream is fed to the cell A 601 and the cell B 603, each the two cells generates a modulation symbol stream s by means of a Forward Error Correction and modulation unit 103. The modulation symbol stream s is input to the TxD encoder 105 and output in the forms of two coded symbol streams x0 and x1. Here, the coded symbol stream x0 is the signal to be transmitted by a virtual antenna 0, and the coded symbol stream x1 is the signal to be transmitted by another virtual antenna 1. In order for a recipient UE to estimate an equivalent channel, each cell sends antenna-specific DRSs for the corresponding virtual antennas. For this purpose, a first multiplexer of each cell multiplexes a first DRS (DRS0) with the coded symbol stream x0. Simultaneously, a second multiplexer of each cell multiplexes a second DRS (DRS1) with the coded symbol stream x1. In this case, the virtual antennas 0 of the cells 601 and 603 are allocated the same DRS 611 (DRS0), and the virtual antennas 1 of the cells 601 and 603 are allocated the same DRS 613 (DRS1).

Next, the each cell configures the two virtual antennas. The precoder 615 configures the virtual antenna 0 of the cell A 601, and the precoder 655 configures the virtual antenna 0 of the cell B 603. The precoder 617 configures the virtual antenna 1 of the cell A 601, and the precoder 657 configures the virtual antenna 1 of the cell B 603.

Although the precoders are used for differentiating between the virtual antennas of each cell, the present invention is not limited thereto. For instance, the precoders are used for differentiating between the frequency/time resources allocated for the transmissions. Since the recipient UE estimates an equivalent channel using the DRSs 611 and 613, it is possible to receive the transmitted symbol streams x0 and x1 distinguishably irrespective of the type of the precoders used in the cells.

The precoded symbol streams can be transmitted through the individual virtual antennas along with a CRS. In FIG. 9, a CRS 621

$$(CRS_0^A)$$

is allocated for a 0th virtual antenna 631 of the cell A 601 and another CRS 623

$$(CRS_{M-1}^A)$$

is allocated for a (MA−1)th virtual antenna 633 of the cell 601. Here, MA denotes a number of transmit antennas of the cell A 601. Similarly, a CRS 661

$$(CRS_0^B)$$

is allocated for a 0th virtual antenna 671 of the cell B 603, and another CRS 663

$$(CRS_{M_A-1}^B)$$

is allocated for a (MB−1)th virtual antenna 633 of the cell B 603. Here, MB denotes a number of transmit antennas of the cell B 603.

As described with reference to FIG. 9, the multi-cell transmission diversity method of the present invention is capable of achieving the transmission diversity gain when the number of transmit antennas of each cell is more than two transmit antennas regardless of the number of cells involved in the collaborative transmission. The multi-cell transmission diversity method of the present invention is advantageous to reuse the conventional transmission diversity receiver structure.

A description is made of the reusability of the conventional transmission diversity receiver structure with reference to the structure of the receiver of FIG. 1. The signal y received through the receive antenna 111 is the sum of the transmitted signal 100 and the AWGN z.

The demultiplexer 121 of the receiver 110 demultiplexes the first symbol stream, the first DRS, the second symbol stream, and the second DRS from the received signal. The first and second DRSs are fed to the channel estimator 123, and the first and second symbol streams are fed to the Txd decoder 125.

Also, the demultiplexer 121 can demultiplex the CRS from the received signal.

The channel estimator 123 estimates the channel on which the first precoded signal is received by using the first DRS and feeds the estimation result to the TxD decoder 125. The channel estimator 123 also estimates the channel on which the second precoded signal is received by using the second DRS and feeds the estimation result to the TxD decoder 125.

The channel estimator 123 also measures the channel condition using the CRS extracted by the demultiplexer 121 and feeds back the measurement results to the transmitter through a transmit antenna (not shown).

The TxD decoder 125 recovers the received modulation symbols using the channel estimation result fed by the channel estimator 123.

The demodulation and decoding unit 127 recovers the transmitted signal from the output of the TxD decoder 125.

Figure 10:
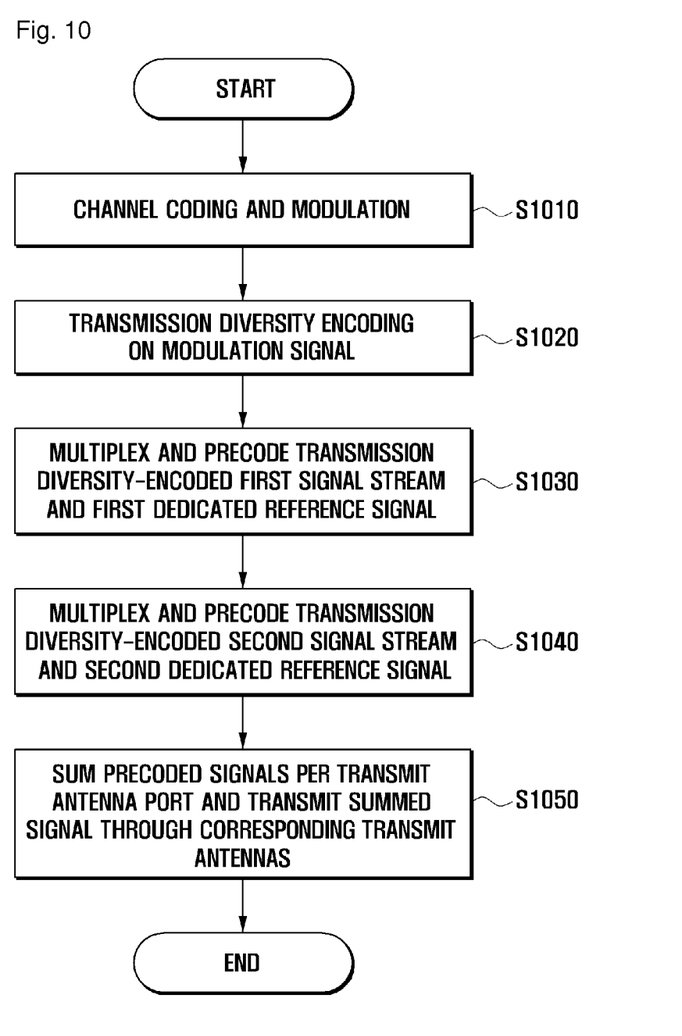
FIG. 10 is a flowchart illustrating a transmission procedure of a multi-cell transmission diversity method according to an exemplary embodiment of the present invention.

FIG. 10 is a flowchart illustrating a transmission procedure of a multi-cell transmission diversity method according to an exemplary embodiment of the present invention.

Referring to FIG. 10, the transmitter first performs channel coding and modulation on the data signal destined to a receiver (S1010). Next, the transmitter performs transmission diversity precoding on the modulation symbol (S1020). As a result of the precoding, the first symbol stream x0 and the second symbol stream x1 are produced. Next, the transmitter multiplexes the first symbol stream with the first DRS (DRS0) and then performs a first type precoding on the multiplexed signal for forming the virtual antenna 0 (S1030). Sequentially, the transmitter multiplexes the second symbol stream with the second DRS (DRS1) and then performs a second type precoding on the multiplexed signal for forming the virtual antenna 1 (S1040). Finally, the transmitter performs summing of the precoded signals per transmit antenna and transmit the summed signals through the transmit antennas (S1050).

Figure 11:
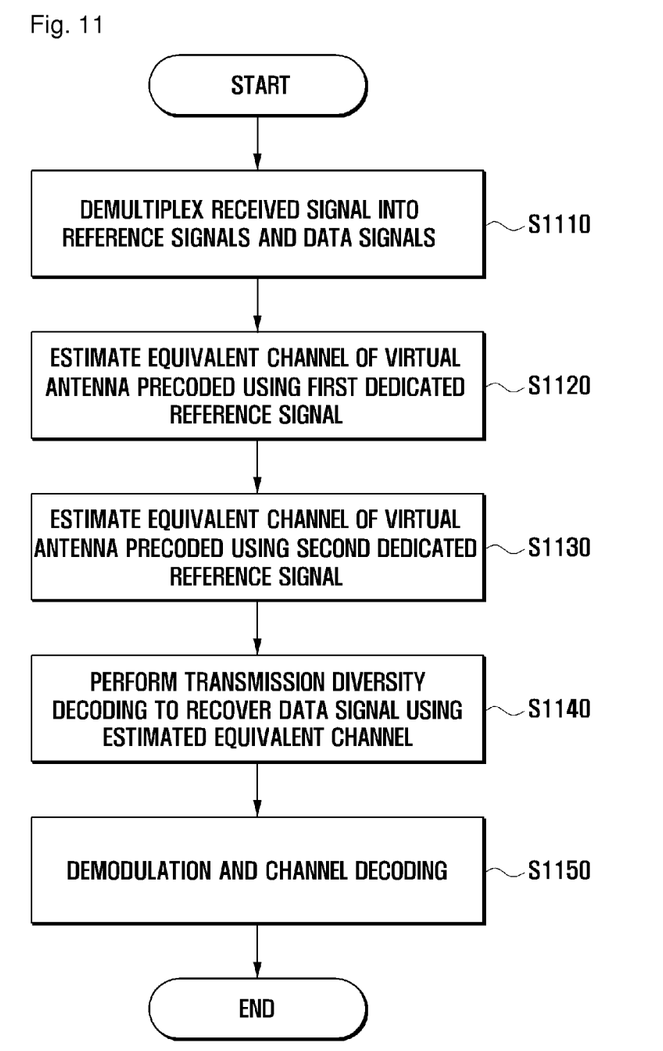
FIG. 11 is a flowchart illustrating a reception procedure of a multi-cell transmission diversity method according to an exemplary embodiment of the present invention.

FIG. 11 is a flowchart illustrating a reception procedure of a multi-cell transmission diversity method according to an exemplary embodiment of the present invention.

Referring to FIG. 11, the receiver first demultiplexes a received signal into DRSs and data signal (S1110). Next, the receiver estimates an equivalent channel of the virtual antenna 0 formed with the first type precoding by using the first DRS (DRS0) (S1120). Sequentially, the receiver estimates an equivalent channel of the virtual antenna 1 formed with the second type precoding by using the second DRS (DRS1) (S1130). The receiver performs transmission diversity decoding on the data signals using the estimated equivalent channels (S1140). Finally, the receiver performs demodulation and channel decoding on the transmission diversity-decoded signal to recover the transmitted signal (S1150).

As described above, the multi-cell transmission diversity method and apparatus of the present invention allows each cell involved in the collaborative transmission to form two virtual antennas using DRS and precoders for transmission diversity, thereby achieving robust and uniform transmission diversity gain regardless of the number of cells involved in the collaborative transmission and the number of antenna of each cell. Also, the multi-cell transmission diversity method and apparatus of the present invention is capable of recovering the transmitted data with channel estimation on the virtual antennas without modification of the conventional receiver structure. Also, the multi-cell transmission diversity method and apparatus of the present invention is configured such that the corresponding virtual antennas of the individual cells involved in the collaborative transmission use the same DRSs, thereby recovering the transmitted data without differentiating between the collaborative cells.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

The invention claimed is:

1. A multi-antenna transmission diversity transmission method of a transmitter, comprising:
    generating a first signal stream and a second signal stream by performing transmission diversity encoding on a data;
    multiplexing and precoding the first signal stream and a first dedicated reference signal into a first diversity signal;
    multiplexing and precoding the second signal stream and a second dedicated reference signal into a second diversity signal; and
    transmitting the first and second diversity signals simultaneously, wherein the first dedicated reference signal and the second dedicated reference signal are user-specific reference signals.

2. The multi-antenna transmission diversity transmission method of claim 1, wherein transmitting comprises multiplexing the first and second diversity signals and corresponding common reference signals, and the common reference signals are cell-specific or antenna-specific reference signals.

3. The multi-antenna transmission diversity transmission method of claim 2, further comprising receiving a measurement report on channel conditions that is transmitted by a receiver,
    wherein the receiver measures the channel conditions using the common reference signals.

4. The multi-antenna transmission diversity transmission method of claim 1, wherein multiplexing and precoding the first signal stream and the first dedicated reference signal comprises forming a first virtual antenna by multiplexing the first signal stream and the first dedicated reference signal and performing the precoding on the multiplexed result.

5. The multi-antenna transmission diversity transmission method of claim 1, wherein multiplexing and precoding the second signal stream and the second dedicated reference signal comprises forming a second virtual antenna by multiplexing the second signal stream and the second dedicated reference signal and performing the precoding on the multiplexed result.

6. A multi-antenna transmission diversity reception method of a receiver, comprising:
    demultiplexing a received signal into a first signal stream, a first dedicated reference signal, a second signal stream, and a second dedicated reference signal, the first and second signal streams carrying a data signal;
    estimating a first channel for receiving a first diversity signal using the first dedicated reference signal;
    estimating a second channel for receiving a second diversity signal using the second dedicated reference signal;
    recovering the data signal using the estimated first and second channels,
    wherein the first and second dedicated reference signals are user-specific reference signals.

7. The multi-antenna transmission diversity reception method of claim 6, further comprising extracting common reference signals corresponding to respective transmit antennas from the received signal, wherein the common reference signals are cell-specific or antenna-specific reference signals.

8. The multi-antenna transmission diversity reception method of claim 7, further comprising:
    measuring channel conditions using the common reference signals; and
    transmitting the measured channel conditions to a transmitter.

9. The multi-antenna transmission diversity reception method of claim 6, wherein estimating the first channel for receiving the first diversity signal comprises estimating the first channel of a first virtual antenna formed by multiplexing the first signal stream and the first dedicated reference signal and precoding on the multiplexed result.

10. The multi-antenna transmission diversity reception method of claim 6, wherein estimating the second channel for receiving the second diversity signal comprises estimating the second channel of a second virtual antenna formed by multiplexing the second signal stream and the second dedicated reference signal and precoding on the multiplexed result.

11. A transmitter for supporting multi-antenna transmission diversity in which multiple cells transmit the same signal to a receiver simultaneously, comprising:
    a transmission diversity encoder which encodes a data into a first signal stream and a second signal stream;
    a first multiplexer which multiplexes the first signal stream with a first dedicated reference signal into a first diversity signal;
    a second multiplexer which multiplexes the second signal stream with a second dedicated reference signal into a second diversity signal;
    a first precoder which performs precoding on the first diversity signal;
    a second precoder which performs precoding on the second diversity signal; and
    at least two antenna which transmit the precoded diversity signals to the receiver,
    wherein the first and second dedicated reference signals are user-specific reference signals.

12. The transmitter of claim 11, further comprising at least one common reference signal multiplexer which multiplexes the precoded diversity signals with corresponding common reference signals, wherein the common reference signals are cell-specific or antenna-specific reference signals.

13. The transmitter of claim 12, further comprising a reception antenna which receives channel conditions transmitted by the receiver, wherein the receiver measures the channel conditions using the common reference signals.

14. The transmitter of claim 11, wherein the first precoder forms a first virtual antenna by multiplexing the first signal stream and the first dedicated reference signal and performing the precoding on the multiplexed result.

15. The transmitter of claim 11, wherein the second precoder forms a second virtual antenna by multiplexing the second signal stream and the second dedicated reference signal and performing the precoding on the multiplexed result.

16. A receiver for supporting multi-antenna transmission diversity in which multiple cells transmit the same signal to the receiver simultaneously, comprising:
 a demultiplexer which demultiplexes a received signal into a first signal stream, a first dedicated reference signal, a second signal stream, and a second dedicated reference signal, the first and second signal streams carrying a data signal;
 a channel estimator which estimates channels for receiving a first diversity signal using the first dedicated reference signal and a second diversity signal using the second dedicated reference signal; and
 a transmission diversity decoder which decodes the data signal using the channels estimated by the channel estimator.

17. The receiver of claim 16, wherein the demultiplexer extracts common reference signals for corresponding transmit antennas of at least one transmitter from the received signal, and the common reference signals are cell-specific or antenna-antenna specific reference signals.

18. The receiver of claim 17, wherein the channel estimator measures the channel conditions using the common reference signals and feeds back the channel conditions to the transmitter.

19. The receiver of claim 16, wherein the channel estimator estimates the channel of a first virtual antenna formed by the first precoder using the first dedicated reference signal.

20. The receiver of claim 16, wherein the channel estimator estimates the channel of a second virtual antenna formed by the second precoder using the second dedicated reference signal.

* * * * *